Sept. 8, 1936.  L. J. A. LE GOFF  2,053,619

POLARIZED ALTERNATING CURRENT RELAY

Filed June 13, 1932

L. J. A. Le Goff
INVENTOR

By: Marko & Clerk
ATTys.

Patented Sept. 8, 1936

2,053,619

UNITED STATES PATENT OFFICE 2,053,619

POLARIZED ALTERNATING CURRENT RELAY

Lucien Joseph Armand Le Goff, Clichy, France, assignor to Societe d'Electricite Mors, Clichy, France Application June 13, 1932, Serial No. 616,961
In France January 15, 1932

5 Claims. (Cl. 175—335)

This invention has for its object an apparatus supplied with alternating current and capable of actuating a movable element such, for instance, as a contact or the like. The operation of the apparatus causes a phase relation to intervene between the supply peculiar to one of its electric circuits and a directing supply.

In the accompanying drawing, given by way of example only,

Figure 1:
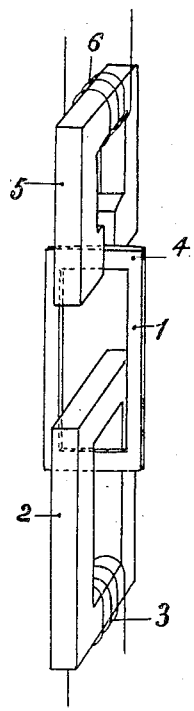
Fig. 1 is a diagrammatic view of a form of apparatus according to this invention.

In Fig. 1, I designates a conducting turn or a set of conducting turns capable of moving or of becoming distorted.

This turn I embraces a closed magnetic circuit 2 which is energized by coils 3.

It will be seen that this arrangement, similar to that of alternating current static transformers, allows the induction, in the movable turn I, of a heavy current when an alternating current passes through the energizing coil or coils 3, and this with good efficiency.

The branch 4 of the turn I is placed in an air gap provided in a magnetic circuit 5 which includes one or more energizing coils 6.

If an alternating current passes through the coil 6, the field of the magnetic circuit varies accordingly.

The mutual action of the alternating field existing in the air gap and of the current passing through the branch 4 of the turn I generates electromagnetic forces capable of imparting a movement to the turn I; the direction, intensity and nature of the movement depend upon the mechanical connections of the turn, and the frequency, intensity and phase relation existing between the currents energizing the coils 3 and 6.

Figure 2:
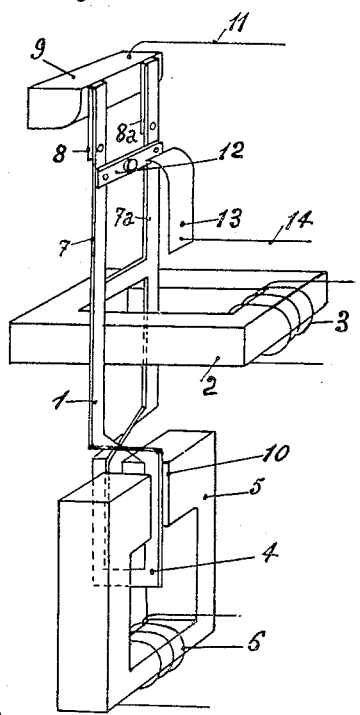
Fig. 2 is a similar view in case the movable element can receive a rotary movement.

Fig. 2 shows a form of construction in which the mechanical connections permit an oscillatory movement of the movable turn.

For that purpose, the useful portion I of the turn is provided with upwardly directed vertical extensions constituted by two arms 7 and 7ᵃ hung, as a pendulum, either from pivots, or from two leaf springs 8 and 8ᵃ connected at the other end to a fixed member 9. The springs 8 and 8ᵃ allow by their flexure an angular movement of the movable member.

The lower portion 4 of the turn I is so arranged as to move in a relatively narrow air gap 10 which forms a part of a magnetic circuit 5 energized by a coil 6.

The upper portion of the turn I embraces a closed magnetic circuit 2 about which it can move.

Energization of the coil 3 induces a flux in the magnetic circuit 2, resulting in the generation of a current in the turn I.

The angular displacement of the turn I is used for actuating one or more contacts. Fig. 2 shows, for instance, an electric circuit comprising the conductor II, member 9, springs 8 and 8ᵃ, cross member 12, contact blade 13 and the conductor 14.

The circuit is closed or opened as the cross member 12 engages or disengages the blade 13.

Figure 3:
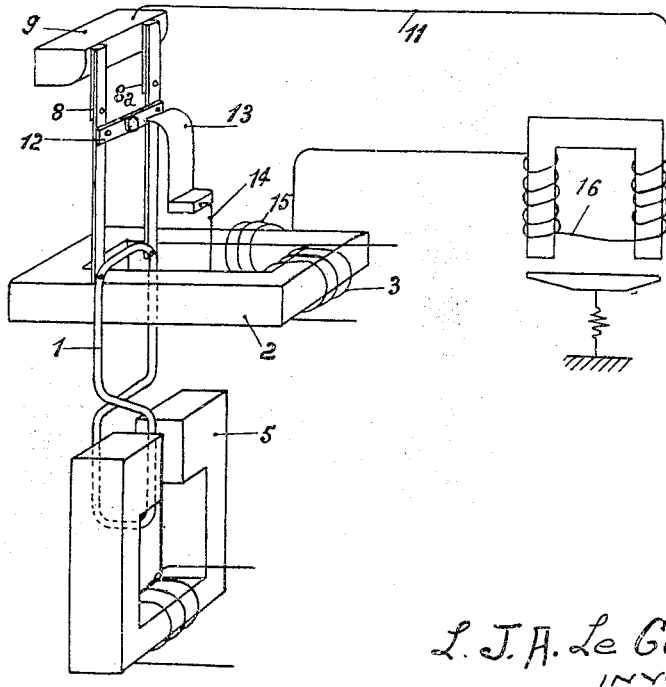
Fig. 3 shows an application of the apparatus.

Fig. 3 shows an application of the apparatus. In this figure, the arrangement of the movable turn I, magnetic circuits 2 and 5, and mechanical connections of the movable object is similar to that of Fig. 2. However, the magnetic circuit 2 comprises two windings 3 and 15. If the winding 3 is energized, current is induced in the turn I, and in the winding 15.

The windings 15 can feed, through the medium of the circuit 14—13—12—8 and 8ᵃ—9—II, an apparatus of utilization such as indicated at 16.

It is to be understood that this arrangement is given by way of example only and that, in particular, the arrangement of the contact and of the apparatus operated thereby may be modified at will according to any particular application.

A suggested application is that in which the apparatus 16 is used as a relay capable of operating a number of contacts. The special properties of the apparatus then result from the association of the characteristics of the relay: power, rapidity, reversibility, response, consumption of energy, etc., and from the phase relation between the directing supply and the particular supply, imposed by the first element of the apparatus.

It is to be noted, that, in this case, and as shown in Fig. 3, short circuiting of the coil 3 directly causes the electromotive force of the coil 15 to be annulled, and, consequently, causes the relay 16 to drop. This arrangement is of particular advantage concerning alternating current track relays used for signalling on railway tracks.

I claim:

1. An alternating current relay comprising a first magnetic circuit with air gap, a movable member constituted by a frame having a bend therein with one portion of the frame lying in one plane and the other portion lying in a plane perpendicular to the first mentioned plane, a closed second magnetic circuit, the first mentioned portion of said frame being arranged in said air gap longitudinally relative to the pole surfaces defining said gap, the second mentioned portion of said frame being embraced by said closed second magnetic circuit and means supporting said member for angular movement about an axis located in the plane of said second frame portion.

2. An alternating current relay as claimed in claim 1, characterized in that said means supporting said member is constituted by leaf springs.

3. An alternating current relay as claimed in claim 1 characterized in that said means supporting said member is located exteriorly of the surface of said second frame portion.

4. An alternating current relay comprising a first magnetic circuit with an air gap, a movable member having a portion thereof arranged in said air gap, a closed second magnetic circuit embracing said member, means supporting said member whereby said portion is displaced longitudinally relative to the pole surface defining said air gap, a main circuit, contacts in said circuit controlled by the displacements of said member, a winding forming part of said circuit and arranged around the closed second magnetic circuit.

5. An alternating current relay as claimed in claim 1 characterized by the provision of a main circuit, contacts in said circuit controlled by the displacements of said movable member, and a winding forming part of said circuit and arranged about said closed second magnetic circuit.

LUCIEN JOSEPH ARMAND LE GOFF.